(No Model.) 2 Sheets—Sheet 2.
J. JÜRT.
DECORTICATING MACHINE FOR GRAIN.
No. 274,002. Patented Mar. 13, 1883.
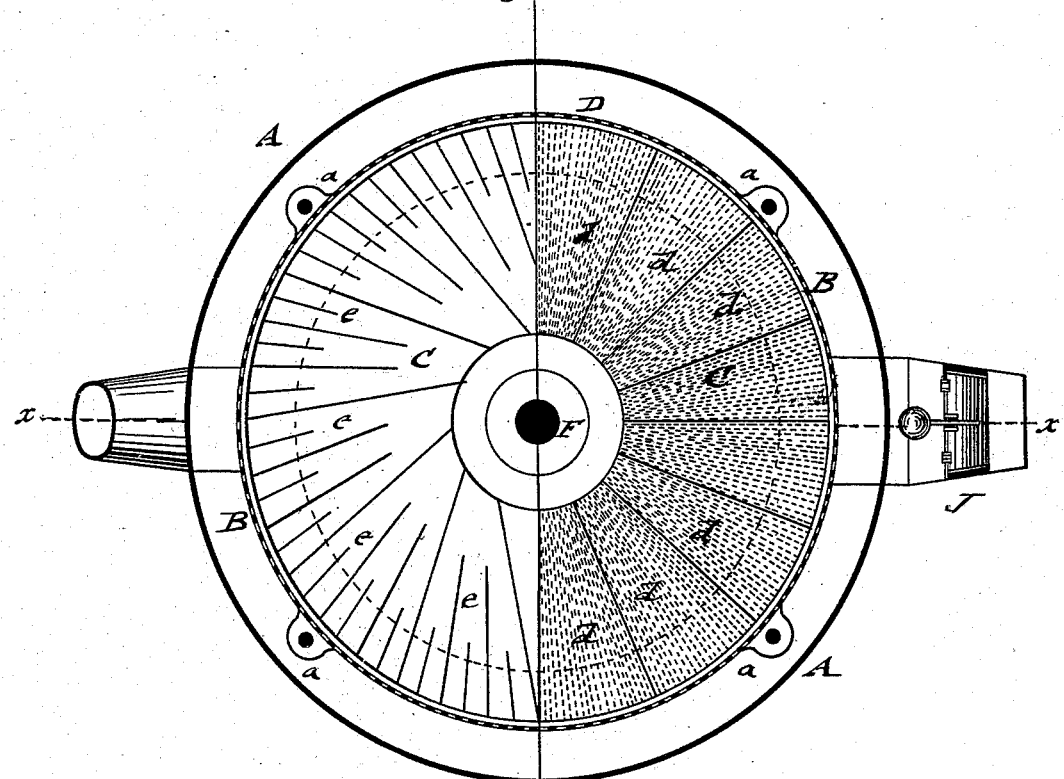
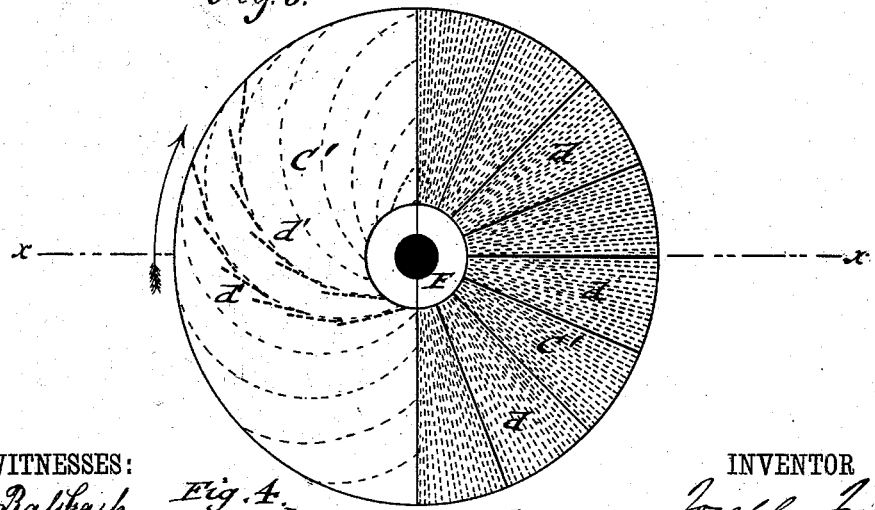
WITNESSES:
H. Rafbach
Otto Risch
INVENTOR
Joseph Jurt
BY Paul Goepel
ATTORNEY

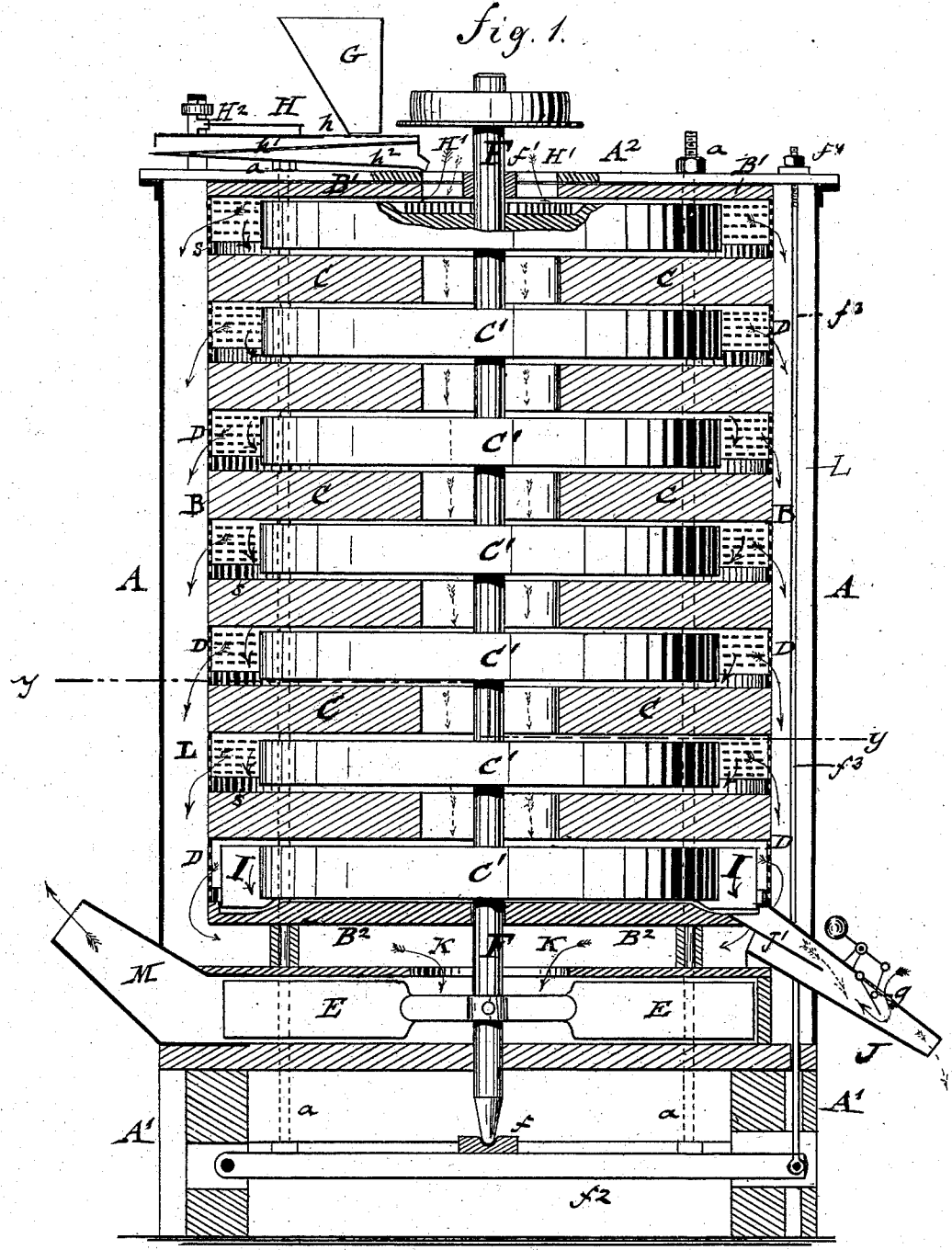

UNITED STATES PATENT OFFICE.

JOSEPH JÜRT, OF CULLMAN, ALABAMA.

DECORTICATING-MACHINE FOR GRAIN.

SPECIFICATION forming part of Letters Patent No. 274,002, dated March 13, 1883.

Application filed July 20, 1882. (No model.)

*To all whom it may concern:*

Be it known that I, JOSEPH JÜRT, of Cullman, in the county of Cullman and State of Alabama, have invented certain new and useful Improvements in Decorticating-Machines for Grain, of which the following is a specification.

This invention has reference to an improved decorticating-machine for grain, rice, peas, and other leguminous grains, which is of simple construction, and which abrades the grain in a uniform and reliable manner in its passage through the machine, the machine being compactly built and capable of being run with little expense and without requiring great power; and the invention consists of a decorticating-machine composed of an exterior cylindrical casing or shell and an interior cylinder that is formed of alternating perforated rings and fixed abrading-disks having center openings. The disks are covered on their upper surfaces with sheet-metal face-plates, having ribs running toward the center openings and on their bottoms with abrading-surfaces. Intermediately between the fixed abrading-disks are arranged rotating disks, which are keyed fast to the vertical central shaft of the machine, that passes through the center openings of the fixed disk. The upper surfaces of the rotating disks are provided with abrading sheet-metal sections and the under sides with spirally-arranged scrapers, by which and by the ribs of the fixed disks, the grain passing through the machine is conducted toward the center opening, and thence to the next pair of abrading-surfaces, and so on successively through the machine. A horizontal suction-fan is arranged in a cylindrical casing in the lower part of the machine, so as to remove the dust and bran which passes through the perforated rings and the annular space between the outer shell and the cylinder formed by the rings and fixed disks into the fan-casing, and thence to the outside. The lowermost rotating disk is provided at the circumference with scrapers for collecting the decorticated grain and conducting it to the discharge-spout, where it is also exposed to a strong air-current, so as to remove the adhering dust.

In the accompanying drawings, Figure 1 represents a vertical central section of my improved decorticating-machine, taken on line $x\ x$, Fig. 2. Fig. 2 is a sectional plan view taken on two planes on the line $y\ y$ of Fig. 1, showing in the left-hand half of the figure the top surface of one of the fixed disks and in the right-hand half of said figure the bottom surface thereof. Fig. 3 is a plan view of one of the rotary disks, taken in two planes, the left-hand half showing the upper surface of said disk and the right-hand half the lower surface thereof. Fig. 4 is a vertical central section of one of the rotary disks on line $x\ x$ of Fig. 3.

Similar letters of reference indicate corresponding parts.

Referring to the drawings, A represents the exterior cylindrical shell, of wood or sheet metal, which is secured to the base part A' of the machine and closed at the top by a cover, $A^2$.

On the inside of the shell A is arranged, concentrically therewith, the interior cylinder, B, which is built up of a number of alternating fixed disks, C, and intermediate perforated rings, D, of stiff sheet metal, which rings may be provided with the stiffening-ribs $s$. The radius of the interior cylinder, B, is from four to five inches smaller than the radius of the exterior shell, A, so that between the interior cylinder and the shell an annular air-space is obtained, through which the dust and bran separated from the grain may be drawn off by a suction-fan, E, in the lower part of the machine. The connection between the fixed disks C and perforated rings D is made by means of vertical stay-bolts, $a$, that extend throughout the full height of the machine, and are tightly screwed together by means of the exterior plate, $A^2$, and the interior covering-plate, B', and by screw-nuts, as shown clearly in Fig. 1. The upright screw-bolts impart the necessary rigidity to the alternating disks C and rings D, and facilitate the setting up of the machine. The fixed disks are provided with central openings of suitable width, through which passes a vertical driving-shaft, F, which is supported in an adjustable step-bearing, $f$, and a neck-bearing, $f'$, arranged in the covers $A^2$ B', said shaft receiving power from a pulley and driving-belt applied to the upper end thereof.

To the vertical driving-shaft F are keyed, in the spaces between the fixed disks C, also in the space between the uppermost fixed disk C and the cover B', and in the space between the lower fixed disk C and the bottom B² in the interior of the cylinder, rotating disks C', whose radii are from four to five inches smaller than the outer radii of the perforated rings D. The rotating disks C', as well as the fixed disks C, are preferably made of wood, constructed of three layers of boards, the grain of each layer crossing that of the adjoining layer, so as to prevent the warping of the boards. After being secured to the vertical shaft F the faces of the rotary disks C are turned off to true plane surfaces, in order that a perfectly horizontal motion may be obtained. The upper surfaces of the rotating disks C', as well as the bottom surface of the cover B' and of the fixed disks C', are covered with sector-shaped pieces $d$ of closely-ribbed abrading-sections of sheet-steel, as shown respectively in Figs. 2 and 3, so as to form thereby a number of lands between which the grain to be decorticated has to pass. The bottom surfaces of the rotating disks C' are provided with small scrapers $d'$, arranged in spiral lines extending from the circumference toward the center, as shown in the left half of Fig. 3, which take up the grain and move it gradually from the circumference toward the center, in connection with the ribbed sheet-metal top surfaces of the fixed disks C, the ribs $e$ being nearly tangential to the circumference of the central openings, and alternately of greater and less length, so as to form sectional lands, as shown clearly in the left half of Fig. 2.

The grain to be decorticated is supplied through a suitable hopper, G, and through openings H' of the covers A² and B' to the upper rotating disk C', which is centrally dished or depressed, and from which the grain passes by centrifugal force between the abrading-surfaces of the cover B' and the disk C' to the outer circumference of the latter, where it drops through the space between the disk and the perforated rings D to the upper surface of the upper fixed disk C, being thence conducted by the spirally-arranged scrapers of the rotating disk C' and the guide-ribs of the fixed disk C back toward the center and dropped through the center opening to the second rotating disk C', thence between the abrading upper surface thereof and the abrading under surface of the upper fixed disk to the outer circumference of the rotating disk, whence it falls to the next fixed disk, and is likewise conducted to the center opening thereof, and so on, passing alternately between the fixed and rotating disks through the entire machine, until it arrives at the lowermost rotating disk, where it is deposited in a circumferential gutter or depression of the bottom B², and conducted by radial scrapers I to the discharge-spout J, as clearly indicated by arrows in Fig. 1.

The lowermost rotating disk C' has no spiral scrapers on its under side. The top surface of the bottom B² is not covered with any abrading sheet metal, but is arranged at a short distance from the bottom surface of the lowermost rotating disk C', so as to admit the vertical adjustment of the driving-shaft F and rotating disks nearer to or farther away from the abrading bottom surfaces of the fixed disks C, so as to properly adjust the machine to the size and condition of the grain to be decorticated. This vertical adjustment of the shaft and its rotating disks is accomplished by supporting the step-bearing $f$ on a lever, $f^2$, and connecting the free end of the lever by a vertical rod, $f^3$, to the cover of the machine, where it passes through the cover and is set higher or lower by an adjusting screw-nut, $f^4$, or other device, as shown in Fig. 1.

A chamber, K, between the bottom B² of the inner cylinder, B, and the fan-casing, communicates with the vertical annular chamber L between the outer shell and the inner cylinder. The abraded bran and dust pass through the perforations in the rings D into the chamber L, thence through chamber K to the suction-fan E, and thence through an eduction-pipe, M, to the outside. The perforated rings D are stiffened at their lower ends by interior ribs of about one inch in height, which does not diminish to too great an extent the surface through which the dust may pass to the annular conducting-chamber L.

When the rotating disks C' are properly adjusted relatively to the fixed disks C the grain which passes by the alternating action of the centrifugal force of the scrapers and guide-ribs of the disks through the machine is uniformly decorticated and cleaned of the bran and other impurities. As the air is drawn in by the suction of the fan through the supply-channel H' in the cover an air-current is created in the different sections of the machine, which goes in the same direction as the grain when the latter passes over the abrading-surfaces, so that the dust is drawn through the perforated rings D; but the grain moves against the air-draft when being returned from the outer circumference of the rotating disks to the center openings of the fixed disks, during which motion the grains rub against each other, so as to exert a polishing action, whereby the dust or bran is entirely separated and carried off through the perforated rings, through the annular surrounding-chamber, and the lower space, K, to the suction-fan E, and thence to the outside.

The discharge-spout J is divided by a transverse partition, J', into two channels. Through the upper channel, formed between the partition J' and the top of the spout, the grain is discharged, while through the lower channel, formed between the partition and the bottom of the discharge-spout, a strong air-current is drawn in in a direction opposite to the direction of flow of the grain, whereby the grain is cleaned of adhering dust and bran before it passes into the bag. If it be desired to regulate the strength of this current, a hinged and weighted air-valve, g, is arranged in the top part of the discharge-spout J, whereby any irregularities in the motion of the machine are compensated in the uniform current of air.

To prevent the entrance of small stones, straw, or other coarser impurities into the machine, the grain is preferably screened before being conducted to the machine. If the same should not be cleaned, it may be passed through a screening device, H, that is arranged at the top of the machine between the supply-hopper and the induction-channel, which device consists of an oscillating screen, h, an inclined diagonal screen, h', and an inclined bottom, h². The coarser impurities pass over the inclined screen and are conducted to the outside, while the grain is conducted through the same and over the inclined bottom to the induction-opening H', and successively through between the fixed and rotating disks of the machine, in the manner hereinbefore described. The screen H is oscillated by a crank, H², connected by pulley and belt with the driving-shaft F.

The machine can be entirely made up and shipped in dismounted state, it requiring no special skill to set it up and place it in running order.

Having thus described my invention, I claim as new and desire to secure by Letters Patent—

1. In a decorticating-machine, the combination of an exterior cylinder or shell, an interior cylinder composed of alternating perforated rings, and fixed disks having center openings, said disks being on their under sides provided with abrading-surfaces and on their upper sides with conducting guide-ribs, a vertical driving-shaft, and rotary disks keyed thereto, provided with abrading-surfaces on their upper sides and spirally-arranged scrapers on the lower sides, substantially as and for the purpose set forth.

2. In a decorticating-machine, the combination of an exterior cylinder or shell, A, an interior cylinder, B, composed of alternating perforated rings D and fixed disks C, having center openings, said disks being provided with bottom abrading-surfaces and top guide-ribs, a vertical driving-shaft, rotary disks C', keyed thereto and provided with abrading top surfaces and spirally-arranged scrapers at the bottom, an air-chamber intermediately between the bottom of the inner cylinder and the blower-casing, which chamber communicates with the annular chamber between the outer shell and the inner cylinder, and a suction-fan arranged below the intermediate air-space, substantially as specified.

3. The combination of the outer cylindrical casing, the inner cylinder composed of alternating perforated rings and fixed disks having central openings, the rotary disks between the fixed disks, a suction-fan below the interior cylinder, a horizontal air-chamber between the fan-chamber and interior cylinder, an annular air-chamber between the outer casing and inner cylinder, which communicates with the horizontal air-chamber, and a discharge-spout which opens into the interior cylinder and into the horizontal air-chamber, said spout being provided with a partition and with a draft-regulating device, substantially as set forth.

In testimony that I claim the foregoing as my invention I have signed my name in presence of two subscribing witnesses.

JOS. JÜRT.

Witnesses:
WILLIAM RICHARD,
G. CHS. HOCHN.